United States Patent
Zhou et al.

(10) Patent No.: US 10,320,846 B2
(45) Date of Patent: Jun. 11, 2019

(54) SYSTEMS AND METHODS FOR GENERATION AND SELECTION OF ACCESS RULES

(71) Applicant: VISA INTERNATIONAL SERVICE ASSOCIATION, San Francisco, AL (US)

(72) Inventors: Haochuan Zhou, Redwood City, CA (US); Hung-Tzaw Hu, Saratoga, CA (US); Rong Zhang, Fremont, CA (US); Benjamin Scott Boding, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 23 days.

(21) Appl. No.: 15/365,389

(22) Filed: Nov. 30, 2016

(65) Prior Publication Data
US 2018/0152478 A1   May 31, 2018

(51) Int. Cl.
*H04L 29/06* (2006.01)

(52) U.S. Cl.
CPC .......... *H04L 63/20* (2013.01); *H04L 63/0263* (2013.01); *H04L 63/10* (2013.01)

(58) Field of Classification Search
CPC ..... H04L 63/20; H04L 63/10; H04L 63/1425; H04L 63/108; H04L 63/205
See application file for complete search history.

(56) References Cited

U.S. PATENT DOCUMENTS 9,853,993 B1 * 12/2017 Zhou .................. H04L 63/1425
2008/0147871 A1    6/2008 Le Pennec
2009/0292568 A1   11/2009 Khosravani et al.
2010/0094765 A1    4/2010 Nandy
2010/0145814 A1    6/2010 Meghani et al.
2012/0324592 A1   12/2012 Korablev et al.
2013/0346294 A1   12/2013 Faith et al.
2014/0012724 A1    1/2014 O'Leary et al.
2015/0373054 A1   12/2015 Chapman

FOREIGN PATENT DOCUMENTS

WO       2004107130       6/2004

OTHER PUBLICATIONS

International Search Report and Written Opinion in connection with PCT/US2017/063911 dated Mar. 16, 2018, 5 pages.

* cited by examiner

*Primary Examiner* — Baotran N To
(74) *Attorney, Agent, or Firm* — Kilpatrick Townsend & Stockton LLP

(57) ABSTRACT

A resource security system may generate access rules for use in determining whether to grant or deny a request for access to a resource. In order to generate the access rules, the resource security system may select certain access request parameters and determine conditions associated with those parameters. The resource security system may generate mutually exclusive segments associated with a condition of each of the parameters. The resource security system may generate independent access rules based on the segments. The resource security system may then evaluate the performance of each of the access rules based on validity information corresponding to previously received access requests that satisfy the conditions of a particular access rule.

20 Claims, 8 Drawing Sheets

SYSTEMS AND METHODS FOR GENERATION AND SELECTION OF ACCESS RULES

BACKGROUND

An unauthorized user may fraudulently request access to a resource using the authorization information of an authorized user. To prevent such fraudulent access, a resource security system may implement access rules to reject access requests having certain parameters that are indicative of fraud. However, in response to being denied access, the unauthorized user may change their method for making fraudulent access requests, thereby changing the parameters, in order to avoid rejection by the access rules. In addition, authorized users may also change their methods for making legitimate access requests over time. Consequently, the performance of the access rules may degrade over time, increasingly denying access to authorized users or increasingly granting access to unauthorized users. Therefore, the access rules may periodically be changed or updated, which may take a significant amount of time and computing resources. Accordingly, there is a need for improved systems and methods for securing access to resources.

BRIEF SUMMARY

A resource security system may generate access rules for use in determining whether to grant or deny a request for access to a resource. In order to generate the access rules, the resource security system may select certain access request parameters and determine conditions associated with those parameters. The resource security system may generate mutually exclusive segments associated with a condition of each of the parameters. The resource security system may generate independent access rules based on the segments. The resource security system may then evaluate the performance of each of the access rules based on validity information corresponding to previously received access requests that satisfy the conditions of a particular access rule.

Other embodiments are directed to systems, devices, and computer readable media associated with methods described herein.

A better understanding of the nature and advantages of embodiments of the present invention may be gained with reference to the following detailed description and the accompanying drawings.

TERMS

Figure 1:
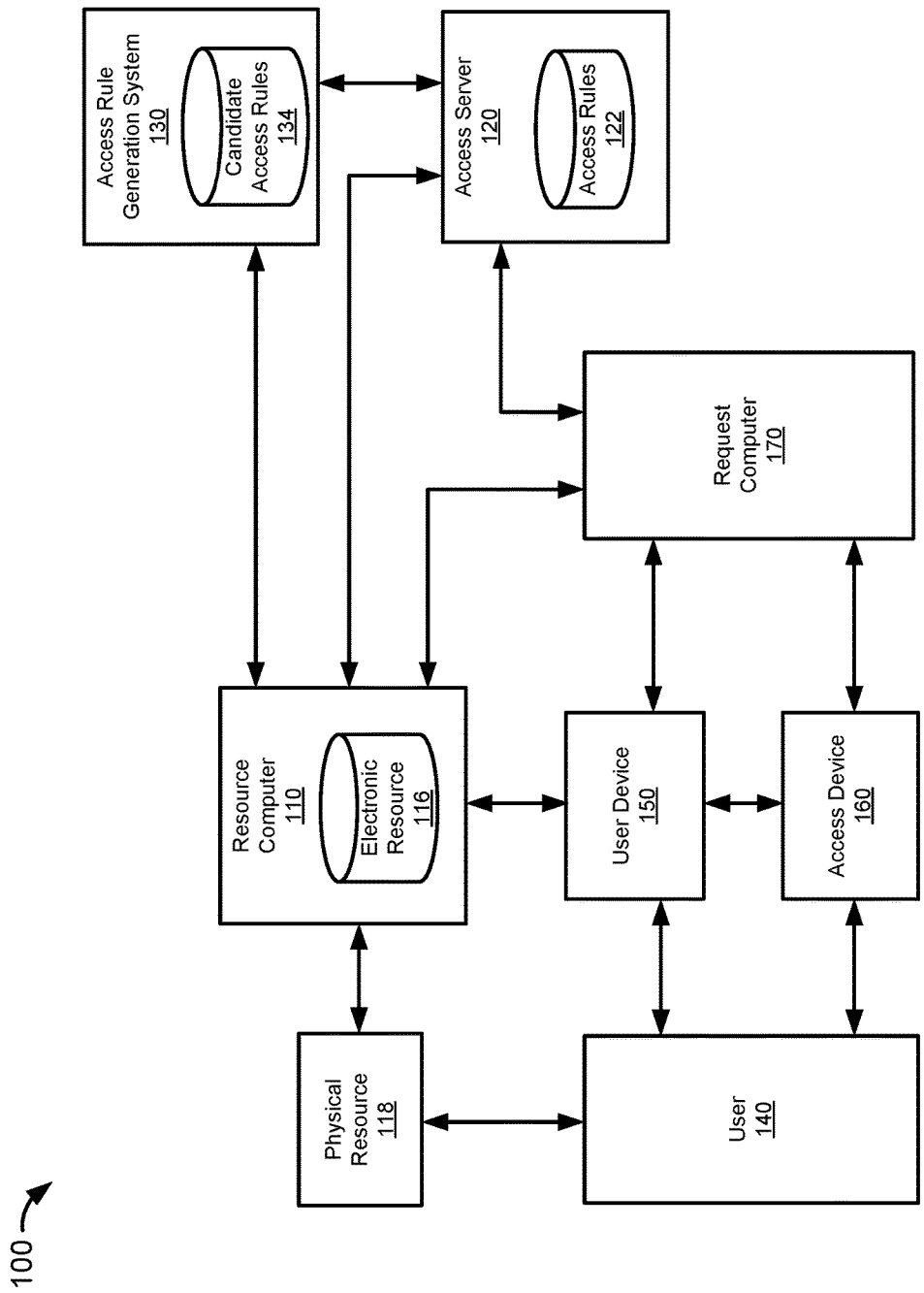
FIG. 1 shows a resource security system for providing access to resources, in accordance with some embodiments.

Prior to discussing embodiments of the invention, description of some terms may be helpful in understanding embodiments of the invention.

The term "resource" generally refers to any asset that may be used or consumed. For example, the resource may be an electronic resource (e.g., stored data, received data, a computer account, a network-based account, an email inbox), a physical resource (e.g., a tangible object, a building, a safe, or a physical location), or other electronic communications between computers (e.g., a communication signal corresponding to an account for performing a transaction).

The term "access request" generally refers to a request to access a resource. The access request may be received from a requesting computer, a user device, or a resource computer, for example. The access request may include authorization information, such as a user name, account number, or password. The access request may also include and access request parameters.

The term "access request parameter" generally refers to information about the access request and when or how it was made. For example, the parameters of an access request may include one or more of: the time that the access request was received, the day of the week that the access request was received, the source-location of the access request, the amount of resources requested, an identifier of the resource being request, an identifier of a user, an identifier of an access device, an identifier of a user device, an identifier of a request computer, a location of the user, a location of the access device, a location of the user device, a location of the request computer, an indication of when, where, or how the access request is received by the resource computer, an indication of when, where, or how the access request is sent by the user or the user device, an indication of the requested use of the resource, and an indication of the type, status, amount, or form of the resource being requested. Access request information may be stored for each access request received by a resource computer. As further described herein, access rules include conditions that may be satisfied by certain parameter values.

The term "access rule" may include any procedure or definition used to determine an access rule outcome for an access request based on certain criteria. In some embodiments, the rule may comprise one or more rule conditions and an associated rule outcome. A "rule condition" may specify a logical expression describing the circumstances under which the outcome is determined for the rule. A condition of the access rule may be involved by an access request parameter based on the parameter having a specific parameter value, based on the parameter value being within a certain range, based on the parameter value being above or below a threshold, or any combination thereof.

A "segment" may represent one or more access rule conditions associated with parameters of an access request. The access rule conditions of a "segment" are mutually exclusive to the access rule conditions of other segments. That is, the conditions are independent. A segmentation diagram having a plurality of segments may be used to represent conditions for potential access rules and previous access requests satisfying those conditions. Since each segment is independent, the fraud detection performance of each segment may be determined simultaneously and in parallel.

An "access rule outcome" of an access rule may represent an outcome determined by that rule based on one or more conditions of the rule and the parameters of the access request. For example, an access rule may provide an access rule outcome of either "reject," "accept," or "review," when its conditions are involved by an access request.

The term "access request outcome" may include any determination of whether to grant access to the resource. The access request outcomes may include "accept," "reject," or "review."

In some embodiments, an access request outcome for an access request may be "reject" if any of the access rules have an access rule outcome of "reject." In some embodiments, an access request outcome for an access request may be "accept" if any of the access rules have an access rule outcome of "accept," regardless of any outcome being "reject." An access request outcome of "accept" may cause the access request to be granted. An access request outcome of "reject" may cause the access request to be denied. The "review" outcome may initiate a review process for the access request. In various embodiments, other outcomes or other meanings of these outcomes may be used.

The term "predictive percentage" refers to the percentage of access requests triggering an access rule that are predicted to be fraudulent. The fraud predictive percentage may be determined based on reports of fraudulent (e.g., invalid or unauthorized) access requests. predictive percentage For example, if an access rule is triggered by 100 access requests within a certain time period and 90 of those access requests are reported to be fraudulent, then the predictive percentage of the access rule for that time period is 90% (e.g., 90÷100).

The term "reporting" generally refers to a process for identifying whether an access request was fraudulent or legitimate. Reporting may involve a user of a resource reporting fraudulent use to the owner or operator of the resource. For example, an owner of a payment account may initiate a charge-back for a fraudulent transaction on their account. In another example, a user of an email account may report a certain email as being "junk" or "spam" mail.

In some situations, an authorized user of a resource may report a denial of access to the resource. For example, a user may report that a legitimate transaction was denied, or the user may report that an email is "not-spam." Such reporting may be used to determine or adjust validity information (e.g., valid/legitimate or invalid/fraudulent) for the corresponding access request. For example, if a report of fraudulent access to a resource is received, the validity information corresponding to the access request which granted access may be updated to indicate that the access request was fraudulent.

The term "server computer" may include a powerful computer or cluster of computers. For example, the server computer can be a large mainframe, a minicomputer cluster, or a group of computers functioning as a unit. In one example, the server computer may be a database server coupled to a web server. The server computer may be coupled to a database and may include any hardware, software, other logic, or combination of the preceding for servicing the requests from one or more other computers.

The term "computer system" may generally refer to a system including one or more server computers coupled to one or more databases.

As used herein, the term "providing" may include sending, transmitting, making available on a web page, for downloading, through an application, displaying or rendering, or any other suitable method. In various embodiments of the invention, rule profiles, rule outcome frequencies, and rule outcome disposition frequencies may be provided in any suitable manner.

DETAILED DESCRIPTION

A resource security system may be used to grant or deny access to resources. In addition, the resource security system may implement access rules to reject access requests having parameters indicative of fraud. If fraudulent access does occur, it may be reported and the resource security system may evaluate the performance of the access rules based on the reports. For instance, the resource security system may use the reports to determine the percentage of false positives produced by the access rules and adjust the validity information accordingly.

Periodically, the resource security system may change or update the access rules based on their performance. To generate an updated set of candidate access rules, the resource security system may select certain parameters of the access request parameters and generate a plurality of potential access rules by segmenting the selected parameters into a plurality of conditions. The resource security system may then evaluate the mutually exclusive segments independently and in parallel, thereby quickly and efficiently generating a set of updated candidate access rules which are selected from the potential access rules.

I. Resource Security System

A resource security system may receive requests to access a resource. In order to determine whether an access request is fraudulent, the resource security system may include an access server for determining an outcome for the access request based on access rules. The resource security system may also include an access rule generation system for generating and selecting the access rules to be implemented by the access server. The resource security system is described in further detail below.

A. Resource Security System for Securing Access to a Resource

FIG. 1 shows a resource security system 100 for providing access to resources, in accordance with some embodiments. The arrows shown in FIG. 1 represent the flow of information between the various elements of the resource security system 100. The resource security system 100 may be used to provide authorized users access to a resource while denying access to unauthorized users. In addition, the resource security system 100 may be used to deny fraudulent access requests that appear to be legitimate access requests of authorized users. The resource security system 100 may implement access rules 122 to identify fraudulent access requests based on the parameters of the access request. The resource security system 100 may periodically update the access rules 122 based on their performance.

The resource security system 100 includes a resource computer 110. The resource computer 110 may control access to a physical resource 118, such as a building or a lockbox, or an electronic resource 116, such as a local computer account, a digital file or document, a network database, an email inbox, a payment account, or a website login. In some embodiments, the resource computer may be a web server, an email server, or a server of an account issuer. The resource computer 110 may receive an access request from a user 140 via a user device 150 (e.g., a computer or a mobile phone) of the user 140. The resource computer 110 may also receive the access request from the user 140 via a request computer 170 coupled with an access device 160 (e.g., a keypad or a terminal). In some embodiments, the request computer 170 may be a service provider that is different from a resource provider that owns or operates the resource computer 110.

The access device 160 and the user device 150 may include a user input interface such as a keypad, a keyboard, a finger print reader, a retina scanner, a biometric reader, a magnetic stripe reader, a chip card reader, a radio frequency identification interface, or a wireless or contactless communication interface, for example. The user 140 may input authorization information into the access device 160 or the user device 150 to access the resource. The authorization information may include one or more of a user name, an account number, a token, a password, a personal identification number, a signature, and a digital certificate, for example. In response to receiving authorization information input by the user 140, the user device 150 or the request computer 170 may send an access request to the resource computer 110 along with one or more parameters of the access request. The access request may include the authorization information provided by the user 140.

In one example, the user 140 may enter one or more of an account number, a personal identification number, and password into the access device 160 to request access to a physical resource (e.g., to open a locked security door in order to access a building or a lockbox) and the request computer 170 may generate and send an access request to the resource computer 110 to request access to that resource. In another example, the user 140 may operate the user device 150 to input a user name and password as a request for the resource computer 110 to provide access to an electronic resource 116 (e.g., a website login or a file) that is hosted by the resource computer 110. In another example, the user device 150 may send data or information (e.g., an email) to request the resource computer 110 (e.g., an email server) to provide the data or information access to an electronic resource 116 (e.g., deliver the email to an inbox). In another example, the user 140 may provide an account number and/or a personal identification number to an access device 160 in order to request access to a resource (e.g., a payment account) for conducting a transaction. The resource computer 110 may also receive access requests in other manners.

In some embodiments, the resource computer 110 may verify the authorization information of the access request based on information stored at the request computer 170. In other embodiments, the request computer 170 may verify the authorization information of the access request based on information stored at the resource computer 110. The resource computer 110 may grant or deny access to the resource based on the verification of the authorization information.

The resource computer 110 may receive the access request substantially in real-time, accounting for delays computer processing and electronic communication. Once the access request is received, the resource computer 110 may determine parameters of the access request. In some embodiments, the parameters may be provided by the user device 150 or the request computer 170. For example, the parameters of the access request may include one or more of: a time that the access request was received, a day of the week that the access request was received, the source-location of the access request, the amount of resources requested, an identifier of the resource being request, an identifier of the user 140, an identifier of the access device 160, an identifier of the user device 150, an identifier of the request computer 170, a location of the user 140, a location of the access device 160, a location of the user device 150, a location of the request computer 170, an indication of when, where, or how the access request is received by the resource computer 110, an indication of when, where, or how the access request is sent by the user 140 or the user device 150, an indication of the requested use of the electronic resource 116 or the physical resource 118, and an indication of the type, status, amount, or form of the resource being requested. In other embodiments, the request computer 170 or the access server 120 may determine the parameters of the access request.

While the resource computer 110 may determine that an access request includes proper authentication information, the resource computer 110 may send the parameters of the access request to the access server 120 in order to determine whether the access request is fraudulent. The access server 120 may store one or more access rules 122 for identifying fraudulent access requests in a system memory of the access server 120. Each of the access rules 122 may include one or more conditions corresponding to one or more parameters of the access request. The access server 120 may determine an access request outcome indicating whether the access request should be accepted (e.g., access to the resource granted), rejected (e.g., access to the resource denied), or reviewed by comparing the access rules 122 to the parameters of the access request as further described below. In some embodiments, instead of determining an access request outcome, the access server 120 may determine an evaluation score based on outcomes of the access rules. The evaluation score may indicate the risk or likelihood of the access require being fraudulent. If the evaluation score indicates that the access request is likely to be fraudulent, then the access server 120 may reject the access request.

The access server 120 may send an indication of the access request outcome to the resource computer 110 (e.g., accept, reject, or review). In some embodiments, the access server 120 may send the evaluation score to the resource computer 110 instead. The resource computer 110 may then grant or deny access to the resource based on the indication of the access request outcome or the evaluation score. For instance, if the access request outcome or the evaluation score received from the access server 120 indicates "accept," then the resource computer 110 may provide the user 140 or the user device 150 access to the resource. If the access request outcome or the evaluation score received from the access server 120 indicates "reject," then the resource computer 110 may not provide the user 140 or the user device 150 access to the resource. If the access request outcome or the evaluation score indicates "review," then the resource computer 110 may initiate a review process for the access request. The review process may involve contacting the user 140 or another entity involved in requesting access (e.g., the resource provider or another service provider).

In some embodiments, the access server 120 may be remotely accessed by a user. Remote access to the access server 120 may provide for both real time and offline monitoring of the operational set of access rules real. For example, the access rule triggering and the predictive power performances may be monitored. The access server 120 may store access request and access rule data and logs in a secure environment and implement user privileges and user role management for accessing different types of stored data. For example, user privileges may be set to enable users to perform one or more of the following operations: view logs of received access request, view logs of access request outcomes, enable or disable the execution of the access rules 122, update or modify the access rules 122, change certain access request outcomes. Different privileges may be set for different users.

In order to evaluate the performance of the access rules, the resource computer 110 may store access request information for each of the access requests that it receives. The access request information may include the parameters of each of the access requests and an indication of the access request outcome for the access request. The resource computer 110 may also store validity information corresponding to each access request. The validity information may indicate whether the access request was legitimate or fraudulent. The validity information associated with an access request may initially be based on the corresponding access request outcome. For instance, the validity information may indicate that an access request is legitimate and that a rejected access request is fraudulent. The validity information may be updated based on reports received for that access request or based on a review process for that access request. In some embodiments, the access server 120 or the request computer 170 may generate and store the access request information and the validity information.

The access rules 122 implemented by the access server 120 may be generated by an access rule generation system 130. In some embodiments, the functions of the access server 120 and the access rule generation system 130 may be performed by the same server or servers. The access rule generation system 130 may generate candidate access rules 134 for the access server 120 based on the access request information and the validity information. The access rules 122 implemented by the access server 120 may be selected from the set of candidate access rules 134. In order to generate the candidate access rules 134, the access rule generation system 130 may receive the access request information and the validity information corresponding to the access request information from the resource computer 110 or the access server 120. The access rule generation system 130 may generate and select the candidate access rules 134 based on the access request information and the corresponding validity information.

The access rule generation system 130 may periodically receive new or updated the access request information and validity information from the resource computer 110 or the access server 120. The access rule generation system 130 may then re-generate the candidate access rules 134 based on the new or updated access request information and validity information. As such, the candidate access rules 134 may be based on the most recent patterns of fraudulent resource use and the most recent patterns of legitimate resource use. The access rule generation system 130 may send the new or updated candidate access rules 134 to the access server 120 to be implemented. The generation and selection of candidate access rules by an access rule generation server is further described below.

B. Access Server for Determining an Access Request Outcome while Performing Rule Evaluation As discussed above, a resource security system may include an access server that uses access rules to determine an access request outcome based on access request parameters. The access rules implemented by the access server may be periodically changed or updated using candidate access rules received from an access rule generation system. The access rule generation system may generate the candidate access rules based on their fraud detection performance. However, it may not be possible to evaluate the fraud detection performance of the access rules currently implemented by the access server since those rules are used to reject access requests that are determined to be fraudulent. For instance, it may not be possible to determine whether an access request outcome of "reject" is a false positive or not when the access request is rejected since the false positive information may be based on reports of fraudulent activity, which would not be received. As further described below, an access server may accept certain access requests that would be rejected by an access rule outcome in order to evaluate the performance of that access rule based on reports received for those access requests.

Figure 2:
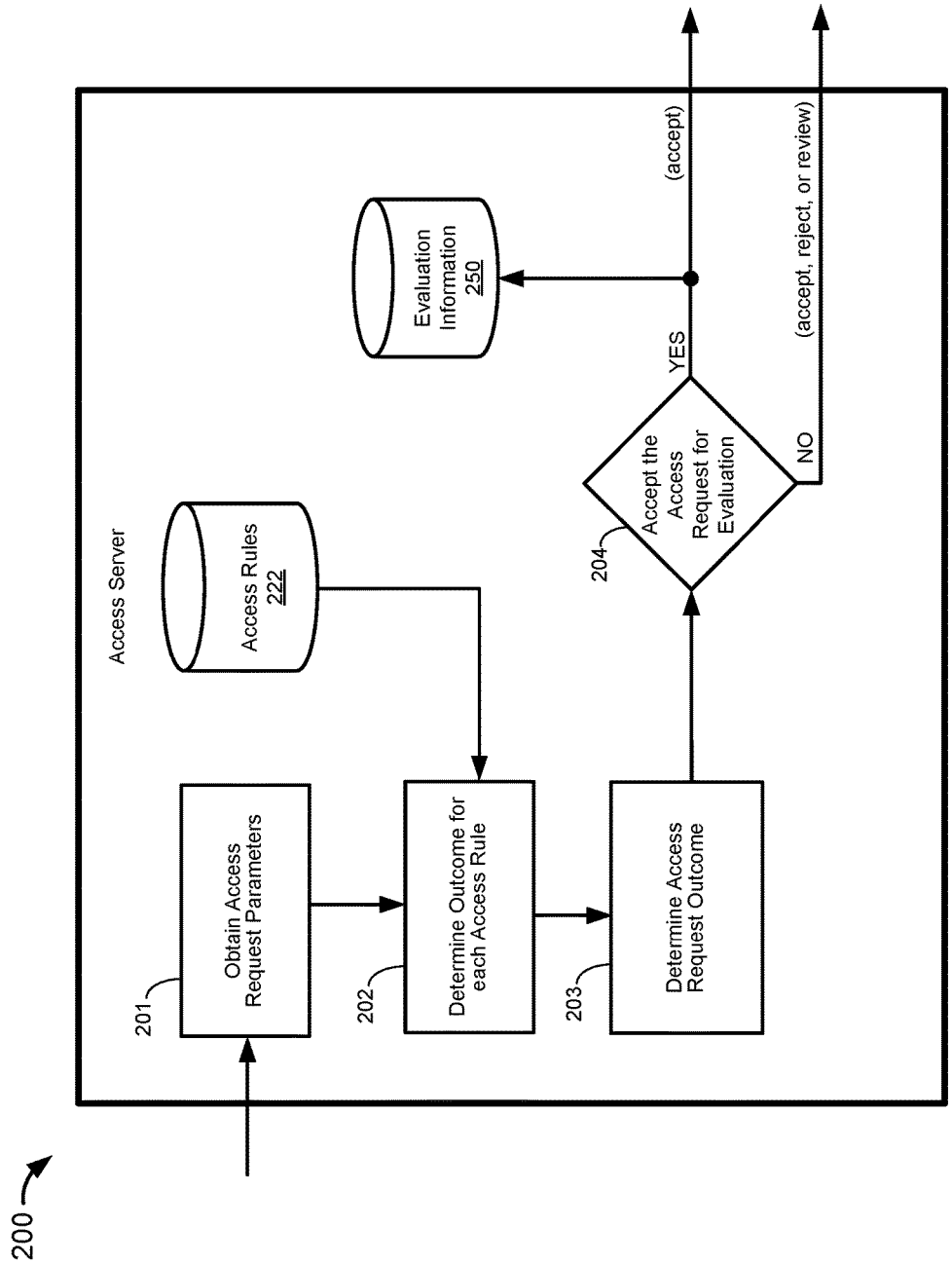
FIG. 2 shows a functional block diagram of an access server for determining an access request outcome while performing rule evaluation, in accordance with some embodiments.

FIG. 2 shows a functional block diagram of an access server 200 for determining an access request outcome while performing rule evaluation, in accordance with some embodiments. The access server 200 may operate similar to the access server 120 of FIG. 1 described above. The access server 200 may be used in a resource security system similar to the resource security system 100 of FIG. 1 described above. As further described below, the access server 200 may load one or more access rules 222 into a system memory of the access server and determine an access request outcome or an evaluation score for an access request based on the parameters of the access request. The access server 200 may then provide the access request outcome or the evaluation score back to the resource computer, which may grant or deny access to the resource accordingly.

First, at 201, the access server 200 may obtain the access request parameters for a certain access request. The access request parameters may be received from a resource computer or from a request computer over a network in real-time. For example, the access request parameters may include one or more of: the time that the access request was received, the day of the week that the access request was received, the source-location of the access request, the amount of resources requested, an identifier of the resource being request, an identifier of a user, an identifier of an access device, an identifier of a user device, an identifier of a request computer, a location of the user, a location of the access device, a location of the user device, a location of the request computer, an indication of when, where, or how the access request is received by the resource computer, an indication of when, where, or how the access request is sent by the user or the user device, an indication of the requested use of the resource, and an indication of the type, status, amount, or form of the resource being requested. In some embodiments, the user, the user device, the access device, or the request computer may provide one or more of the parameters of the access request.

At 202, after obtaining the access request parameters, the access server 200 may determine an access rule outcome for each access rule 222. In order to determine the access rule outcomes, the access server 200 may access the system memory of the access server 200 to obtain the access rules 222. Each access rule 222 includes one or more conditions that may be satisfied by a certain parameter value or range of parameter values. The access server 200 may determine an access rule outcome for a particular access rule 222 by comparing the parameter values of the access request parameters to the one or more conditions of the access rule 222. If the parameter values of the access request satisfy the one or more conditions of that particular access rule 222, then the access rule 222 is "triggered" by that access request and the access rule 222 provides its associated access rule outcome.

The access rule outcome for a particular access rule 222 may be one of "accept," "reject," or "review." In some embodiments the access rule outcome may be an evaluation score indicating accept, reject, or review.

In one example of determining an access rule outcome, access request parameters may be received for a request to access a website account login. In this example. the parameters of the access request may include a "source location" indicating the geographic location of the user or device that is requesting access and an "authorized user location" indicating the geographic location of the authorized user of the website account. In this example, a certain access rule may have conditions that are satisfied (e.g., triggered) when the "source location" does not match the "authorized user location." Since the "source location" not matching the "authorized user location" may be indicative of fraudulent activity, the access rule may have an outcome of "reject" when triggered. Accordingly, an access request coming from a location that does not match the location of the authorized user may be rejected.

In another example of determining an access rule outcome, an access request may be for a payment transaction and the parameters of the access request may include the "transaction amount" and the "shipping country" for shipping goods purchased in the transaction. In this example, a certain access rule may have conditions that are satisfied when the "transaction amount" is over $1,000 and when the "shipping country" is a country having higher reporting of fraud. This access rule may have an access request outcome of "reject." Accordingly, a access request for a transaction to ship goods amounting to over $1,000 to a certain country may be rejected.

In another example of determining an access rule outcome, an access server may obtain access request parameters for an access request to deliver an email message to an inbox. The parameters of the access request may include one or more alphanumeric keywords from the email message and a "source IP address" of the email message. In this example, a certain access rule may have a first condition that is satisfied when one or more of the keywords matches one or more stored words indicative of "spam" or fraud. The access rule may have a second condition that is satisfied when the IP address falls within a certain range of IP addresses. Accordingly, a spam email message may not be delivered to an inbox if it contains certain keywords and is sent from a certain range of IP addresses.

At 203, after determining the access rule outcome for each of the access rules 222, the access server 200 may determine an access request outcome based on the access rule outcomes.

The access request outcome may indicate "accept," "reject," or "review." In one example of determining an access request outcome, the access server 200 may determine an access request outcome of "accept" if any of the access rule outcomes are "accept." In another example, the access server 200 may determine an access request outcome of "reject" if one or more of the access rule outcomes are "reject" and none of the access rule outcomes are "accept." In another example, the access server 200 may determine an access request outcome of "review" if one or more of the access rule outcomes are "reject" and one or more of the access rule outcomes are "accept." In other embodiments, the access server 200 may determine an access request evaluation score based on the access rule evaluation scores. The access request evaluation score may indicate an outcome of "accept," "reject," or "review" based on threshold values.

As mentioned above, the access rules implemented by the access server 200 may be evaluated in order to determine their fraud detection performance. At 204, the access server 200 may determine whether to accept a particular access request in order to evaluate the performance of the triggered access rule. For instance, if the access request outcome is not "reject" or "review," the access server 200 may provide an access request outcome of "accept" instead, thereby causing the access request to be granted which allows for fraudulent access to be reported if it occurs. By accepting the access request, a percentage of false positives produced by the triggered access rule may be determined based on the reports received. For instance, an access rule having an outcome of "reject" may be triggered by an access request that is accepted during an evaluation process. If fraudulent access is not reported for that access request, that indicates that the triggering of the access rule was a false positive. Such false positive information for an access rule 222 may be used to adjust validity information for other access requests that triggered that same access rule 222.

At 204, the access server 200 may determine whether to evaluate the triggered access rule based on certain criteria or thresholds. For example, the access server 200 may determine to perform evaluation based on one or more of: the number of access requests received since the last evaluation, the number of access requests that have triggered this access rule since the last evaluation, the amount of time since the last evaluation, the amount of time since the this access rule was evaluated, and a random number generator. In one example, the access server 200 may accept 1 in every 100 access requests that would have been rejected by a certain access rule. In another example, the access server may automatically accept 0.5% of all access requests based on a random number generator.

If the access server 200 determined to not accept the access request as part of an evaluation process at 204 (e.g., the decision at step 204 is NO), then the access server 200 may provide an indication of the access request outcome (e.g., accept, reject, or review). The indicated of the access request outcome may be sent to the computer that sent the access request or access request parameters to the access server 200 (e.g., the resource computer or the request computer). However, if the access server 200 determined to accept the access request for evaluation of the triggered access rule (e.g., the decision at step 204 is YES), them access server may provide an indication that the access request outcome is "accept," regardless of the access request outcome determined at step 203.

The access server may store evaluation information 250 regarding the access request and the access rule being evaluated. The evaluation information 250 may include identifiers of the access rules 222 being implemented by the access server 200. The evaluation information may also include records for each access request accepted during the evaluation process at 204.

The records for each access request may include an identifier of the access requests that was accepted, an identifier of the triggered access rules 222, and the access request outcome determined at 203. The evaluation information 250 may also include an indication of the parameters of the access request that was accepted for evaluation of the triggered access rule.

Since patterns of fraudulent and legitimate access may change over time, the fraud detection performance of the currently implemented access rules 222 may degrade over time. By accepting certain access requests for evaluation of the currently implemented access rules 222, it is possible determine the whether those access rules are providing false positives as discussed above. Therefore, access rules 222 that having poor fraud detection performance may be updated or replaced by better performing access rules. Evaluation of the currently implemented access rules is advantageous because fewer false positives means that fewer authorized users are inadvertently denied access resources. Evaluation is also advantageous because fewer fraudulent access request are granted, thereby improving the security of the resources.

II. Access Rule Generation and Selection Using a Decision Tree

As discussed above, a resource security system may include an access rule generation system for generating and selecting candidate access rules to be implemented by an access server. In some embodiments, the access rule generation system may generate access rules using a decision tree or using segmentation as further described below.

Figure 3:
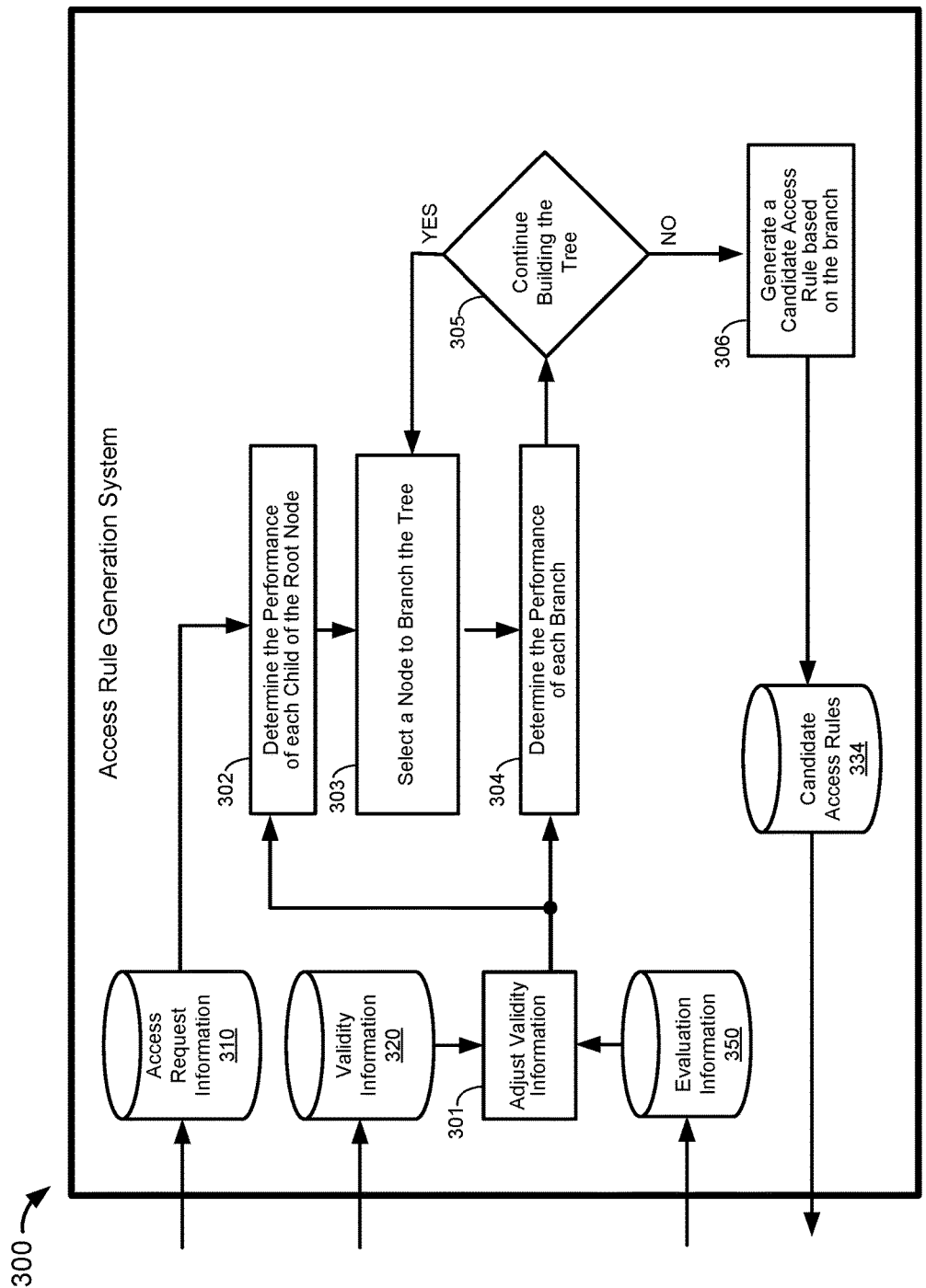
FIG. 3 shows a functional block diagram of an access rule generation system for generating and selecting access rules using a decision tree, in accordance with some embodiments.

FIG. 3 shows a functional block diagram of an access rule generation system 300 for generating and selecting access rules using a decision tree, in accordance with some embodiments. The access rule generation system 300 may operate similar to the access rule generation system 130 of FIG. 1. The access rule generation system 300 may be implemented in a resource security system similar to the resource security system 100 of FIG. 1 described above.

As further described below, the access rule generation system 300 may generate candidate access rules 334 using a decision tree based on access requests previously received by an access server. The access rule generation system 300 generate a decision tree having nodes corresponding to certain access rule parameter conditions. The access rule generation system 300 may then determine the performance of nodes within a branch of the decision tree. The performance of a branch may be based on the validity information of access requests having parameters corresponding to the conditions of the branch. The access rule generation system 300 may continue to select nodes to build the branch until the best performing branch is determined. The access rule generation system 300 may then generate a candidate access rule 334 having conditions corresponding to the conditions of the branch.

The access rule generation system 300 may continue building candidate access rules using the decision tree. The access rule generation system 300 may determine the next best performing branch by returning to a higher node in the tree to continue evaluating performance of the branches. After generating one or more candidate access rules 334, the access rule generation system 300 may provide the candidate access rules 334 to an access server to be used for determining access request outcomes.

A. Stored Information for use in Generating Access Rules

The access rule generation system 300 may store information that is the basis for the access rules that are generated. The stored information may reflect the types of fraudulent and legitimate resource use that the generated access rules can identify. The access rule generation system 300 may store access request information 310, validity information 320, and evaluation information 350. The access request information 310, the validity information 320, and the evaluation information 350 may be received from one or more of a resource computer, a request computer, and an access server.

The access request information 310 may include a plurality of access requests that were previously received by an access server. The access request information 310 may include access request parameters for each of the access requests. The access request information 310 may also include an indication of whether the access request outcome was rejected, accepted, or reviewed.

The validity information 320 may indicate whether each access request in the access request information 310 is legitimate or fraudulent. For instance, the validity information 320 may indicate that a certain access request of the access request information 310 was reported to be fraudulent or an indication that a certain access request was reported to be legitimate. The validity information corresponding to certain access request may also be based on the access request outcome for that access request as determined by the access server. For instance, a rejected access request may initially have corresponding validity information indicating that the access request is fraudulent and an accepted access request may initially have corresponding validity information indicating that the access request is legitimate. The validity information 320 corresponding to a certain access request may be updated over time based on a report of fraudulent access or reports of the denial of legitimate access (e.g., a report may not be received until a later time, or additional reports for a certain access request may be received later).

The evaluation information 350 may include identifiers of the access rules being implemented by the access server. The evaluation information 350 may also include records for each access request accepted during an evaluation process at the access server. The records for each access request includes one or more of an identifier of the access requests that was accepted, an identifier of the triggered access rule, and the access request outcome. The evaluation information 350 may also include an indication of the parameters of the access request that was accepted for evaluation of the triggered access rule.

B. Adjusting the Validity Information to Account for False Positives

Before generating potential access rules, at 301 the access rule generation system 300 may adjust the validity information 320 using the evaluation information 350. The access rule generation system 300 may adjust the validity information 320 to account for false positives in the access requests rejected by the access rules implemented by the access server. The access rule generation system 300 may determine the false positive percentage for a certain access rule (e.g., an access rule implemented by an access server) based on the reports received for access requests triggered by that access rule (e.g., the access request was were accepted during an evaluation process).

In one example of adjusting the validity information, the evaluation information 350 may indicate that access server accepted, instead of rejected, one hundred access requests triggered by a particular access rule over a certain period of time. However, the validity information 320 may indicate that only sixty of the access requests out of the hundred access requests have been reported as being fraudulent. In this example, the outcome of the access rule was a false positive 40% of the time (e.g., 40 of 100). The access rule generation server 300 may adjust the validity information corresponding to the access requests rejected by that access rule to account for the access rule's 40% false positive percentage. For instance, the access rule generation server 300 may adjust the validity information for the corresponding access requests such that the validity information indicates that 40% of the access requests triggering the access rule are legitimate, instead of fraudulent. In another example, a valid access request may be assigned a validity score of 0.0 in the validity information 320 and a fraudulent access request may be assigned a validity score of 1.0. The access rule generation system 300 may then adjust the validity score corresponding to access requests that triggered an access rule based on the false positive percentage. In this example, the access rule generation system 300 may assign a validity score of 0.6, instead of 1.0, to access requests rejected by the access rule that provides false positives 40% of the time. As such, these access requests may be considered to be 60% fraudulent instead of 100% fraudulent. The adjusted validity information (e.g., validity score) may be used by the access rule generation system 300 in determining the performance of the potential access rules.

By adjusting the validity information 320 to account for false positives, it is possible for the access rule generation system 300 to select access rules to replace under-performing access rules that are currently implemented by the access server, thereby leading to fewer false positives in the future. Having fewer false positives is advantageous since, depending on the purpose and implementation of the access server, more accurate access rules leads to fewer users being denied access to their website accounts, fewer legitimate transactions for goods or services being denied, and fewer legitimate emails being labeled as "junk" email, for example. In addition, user devices and the resource computer may consume fewer network resources in the process of requesting access to resources since fewer legitimate access requests will need to be re-sent due to false rejections.

The adjusted validity information may be used in the generation of access rules, regardless of the method used. For example, adjusted validity information may be used to generate access rules using a decision tree and it may also be used to generate access rules using segmentation. Using a decision tree, a set of access requests may correspond to a certain branch of the decision tree and the adjusted validity information for those access requests may be used to determine the performance of the branch. Using segmentation, a unique set of access requests may correspond to a certain mutually-exclusive segment of conditions and the adjusted validity information for those access requests may be used to determine the performance of the segment. The generation of access rules using a decision tree is further discussed below with reference to FIG. 4 and the generation of access rules using segmentation is further discussed below with reference to FIGS. 5 and 6.

C. Use of a Decision Tree in Generating Access Rules

Figure 4:
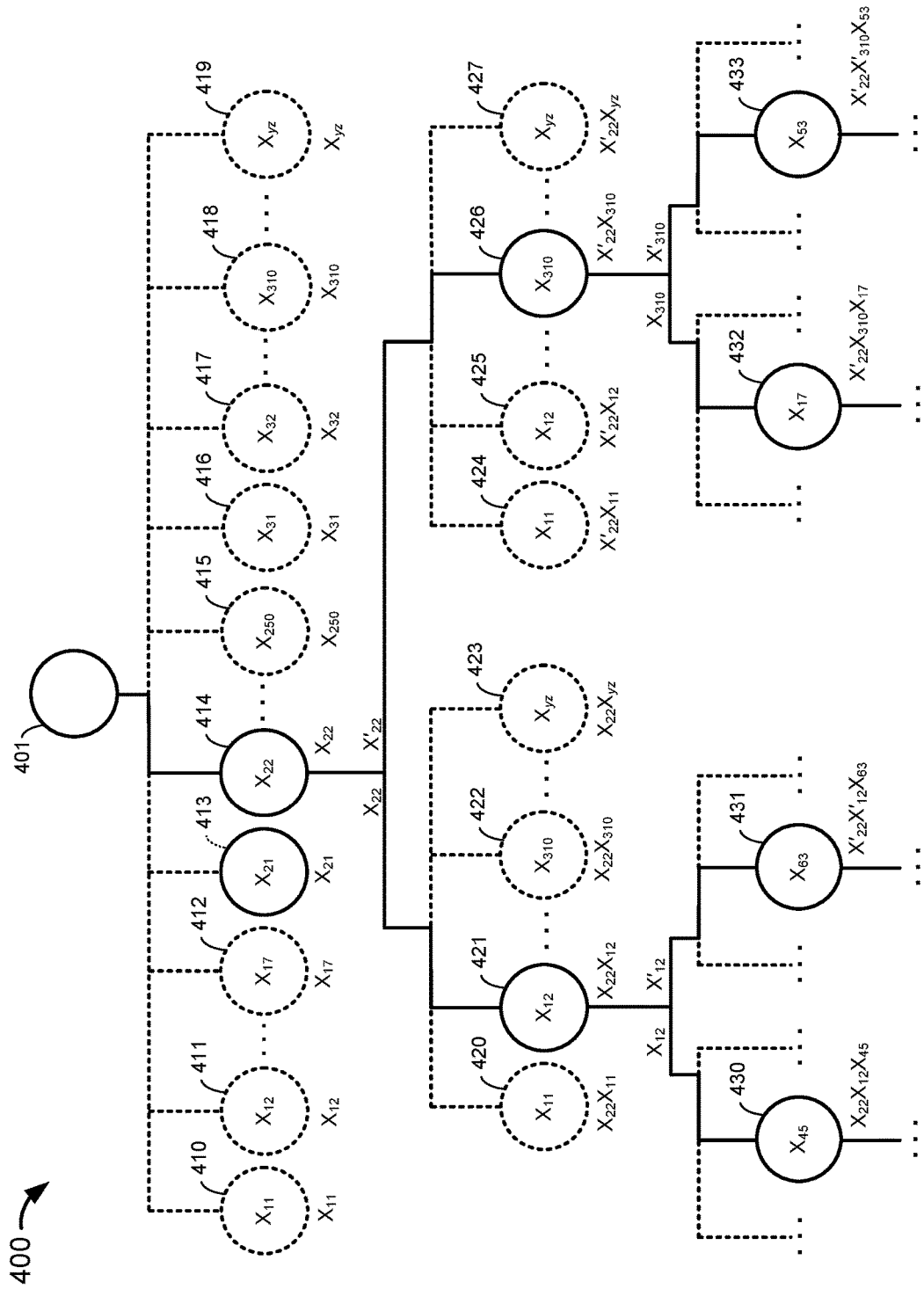
FIG. 4 shows an exemplary decision tree for generating access rules, in accordance with some embodiments.

The access rule generation system 300 may use a decision tree to generate access rules using the process at 302-307. FIG. 4 shows an exemplary decision tree 400 for generating access rules, in accordance with some embodiments. The decision tree 400 includes a plurality of "nodes" 401, 410-419, 420-426, and 430-433. In the decision tree 400 of FIG. 4, the nodes are represented by circles. The decision tree 400 begins at a "root" node 401 that "branches" down to a plurality of "children" nodes which are connected to the root node 401 by vertices. For instance, the nodes 410-419, which are connected to the root node 401, are children of the root node 401, the nodes 420-246 are children of node 414, and the nodes 430-433 are children of node 421. The interconnected nodes moving from parents to children down the tree are generally referred to as a "branch" of the decision tree 400. As further described below, a branch of the decision tree 400 may be used to generate access rules. In the decision tree 400, the children nodes are only connected to the parent node. The children nodes are not interconnected to each other.

In FIG. 4, each of the nodes represents a condition of an access rule, which is indicated within the node. For example, node 414 represents the condition $X_{22}$. In addition, each branch of nodes represents one or more conditions of an access rule, which is indicated below the node. For example, the branch including node 414 and node 423 represents the condition $X_{22}X_{31}$. In the decision tree 400, the root node 401 may not represent any condition. The access rule generation system 300 may determine the conditions of the nodes based on the access request parameters in the access request information 310. In FIG. 4, the best performing nodes/branches are have solid lines and the other nodes/branches have dashed lines. For simplicity of representation, FIG. 4 does not show all nodes or branches of the decision tree 400. For instance, the nodes of the decision tree 400 which are not shown in FIG. 4 are represented by an ellipsis ( . . . ). In addition, certain branches of the decision tree 400 are not shown in FIG. 4.

The access rule generation system 300 may use the decision tree 400 to generate an access rule having certain conditions. The access rule generation system 300 may generate the decision tree 400 based on the access request information 310. In other embodiments, the access rule generation system 300 may generate a different decision tree according to different access request information. For example, the access request parameters may include a parameter $X_1$ indicating a "day of the week" parameter for an access request. In this example, the access rule generation system 300 may determine seven conditions, $X_{11}$, $X_{12}$, $X_{13}$, $X_{14}$, $X_{15}$, $X_{16}$, and $X_{17}$, corresponding to the seven days of the week possible for parameter $X_1$. Another parameter, $X_2$, may indicate a "shipping state" parameter of an access request and may include fifty conditions $X_{21}$ through $X_{250}$ corresponding to each of the fifty U.S. states. Another parameter, $X_3$, may indicate a "resource amount" parameter of an access request and may include 10 conditions $X_{31}$ through $X_{310}$ corresponding to ten mutually exclusive numerical ranges of resource amounts. The decision tree 400 may further include other non-specified parameters conditions $X_{yz}$.

The access rule generation system 300 may generate an access rule having certain conditions based on the decision tree 400. In general, a decision tree process for generating access rules may evaluate each node in the first level down to determine the best performing node. The best performing node may have the fewest decision errors (e.g., "false positives" where a legitimate access request is determined to be fraudulent and "false negatives" where a fraudulent access request is not detected). The performance may be based on the amount or percentage of decision errors or based on the predictive percentage of the conditions of the node. Then the decision tree process makes a binary split at the best performing node such that the left split is a first tree where the condition of the best performing node is satisfied and the right split is a second tree where the condition of the best performing node is not satisfied. This performance evaluation and splitting process is repeated until one or more stop criterion are met.

An example decision tree process for generating access rules is described below. Referring back to FIG. 3, at 302, the access rule generation system 300 may determine the fraud detection performance of each child 410-419 of the root node 401 shown in FIG. 4. To determine the performance of each child node 410-419, the access rule generation system 300 may determine a set of access requests from the access request information 310 that have parameters satisfying the conditions associated with a particular node 410-419. The access rule generation system 300 may determine the performance for each particular node 410-419 based on the validity information 320 of their corresponding access requests. The performance may be determined based on a "prediction error" percentage. The detection error percentage may be based on the percentage of "false positives" (e.g., a legitimate access request being determined to be fraudulent) and the percentage of "false negatives" (e.g., a fraudulent request being determined to be legitimate) for the conditions associated with a particular node. As mentioned above, the validity information 320 may be adjusted at 301. For example, there are 100 access requests in total. In this example, the access rule generation system 300 may determine access requests outcomes for the 100 access requests based on condition $X_{22}$ (represented by node 414).

The access rule generation system 300 may determine the number access request out of the 100 access requests that would be granted, and the number of access requests that would be denied, based on whether condition $X_{22}$ (represented by node 414) is satisfied. In this example 10 of those 100 access requests outcomes are a false positive or a false negative. As such, the detection error percentage for splitting at node 414 may be 10%. Nodes having a lower detection error percentage are deemed to have higher performance compared to other nodes having a greater detection error percentage (e.g., fewer errors means better performance).

At 303, the access rule generation system 300 may select the best performing node (e.g., the node having the greatest fraud predictive percentage) to split the decision tree. For example, referring to FIG. 4, the access rule generation system 300 may determine that node 414 associated with the condition $X_{22}$ has the highest performance (e.g., the split at node 414 has a lower detection error percentage compared to the other children nodes 410-413 and 415-419). Accordingly, the access rule generation system 300 may select node 414 to split the branch. As shown in FIG. 4, the solid line indicates the nodes add branches having the best performance at each level while the dashed lines show the other possible nodes. In FIG. 4, there is a solid line connecting node 401 to node 414 while nodes 410-413 and 415-419 are connected to node 401 by dashed lines.

The split at node 414 may be a binary split such that the left split is a first tree (containing nodes 420-423 in FIG. 4) where the condition of the best performing node (i.e., condition $X_{22}$ of node 414) is satisfied and the right split is a second tree (containing nodes 424-427 in FIG. 4) where the condition of the best performing node is not satisfied. As shown in FIG. 4, the prime symbol (') is used to indicate that the corresponding condition is not satisfied. For example, the condition labeled $X'_{22}$ indicates that condition $X_{22}$ is not satisfied. From the binary split at node 414, nodes 420-423 in the left split include condition $X_{22}$ while nodes 424-427 in the right split include the condition $X'_{22}$. As shown in FIG. 4, both the left split from node 414 and the right split from node 414 are connected by solid lines, indicating the best performing branches of the tree.

At 304, after selecting the first node of the branch (e.g., node 414) beyond the root node 401 to split, the access rule generation system 300 may then determine the performance of each of the nodes in the second level of the tree (e.g., nodes 420-427), including the nodes in the left split of node 414 (e.g., nodes 420-423) and the nodes in the right split of node 414 (e.g., nodes 424-427).

As shown in FIG. 4, each node in the second level of the tree (nodes 420-427) includes the conditions corresponding branch split. In FIG. 4, the conditions are shown below the node. For instance, the branch comprising node 421 has the conditions of $X_{22}X_{12}$ since node 414, the parent of node 421, has condition $X_{22}$ and node 421 has the condition $X_{12}$. In some embodiments, the children of node 414 may not include conditions within the $X_2$ parameter since the node 414 is associated with a condition of that parameter (e.g., $X_{22}$). After building the branches, the access rule generation system 300 may determine, for each branch, the access requests of the access request information 310 that satisfy the each of the conditions of the nodes included within that branch. Then the access rule generation system 300 may determine the performance for each of the nodes in the second level of the tree (e.g., nodes 420-427) based on the validity information 320 corresponding to the access requests having parameters that satisfy the conditions of the particular node (or, for right splits, where a particular condition is not satisfied as indicated by the prime symbol).

At 305, the access rule generation system 300 may determine whether to continue building the current branch based on one or more stop criterion (e.g., the tree contains a certain number of levels, or when each of the nodes corresponds to only valid, or only invalid access requests). If the access rule generation system 300 determines to continue building the branch (e.g., the decision at 305 is YES), then the access rule generation system 300 may return to 303 to repeat the process of selecting a node for building the tree and then determining, at 304, the performance of the branches The access rule generation system 300 may select a node to build the tree for each split of the tree (e.g., the left split of node 414 and the right split of node 414). Referring to FIG. 4, the access rule generation system 300 may determine that node 421 (conditions of $X_{22}X_{12}$) has a higher performance than the other nodes within the left split of node 414 (i.e., nodes 420, 422, and 423). For the right split of node 414, the access rule generation system 300 may determine that node 426 is the highest performing node of the nodes within the right split (e.g., nodes 424-427).

At 305, the access rule generation system 300 may determine whether to continue building the tree based on the one or more stop criterion. If the access rule generation system determines to continue building the tree, then the process selecting the best performing nodes for each split repeats until the one or more stop criterion are met. As shown in FIG. 4, node 430 may be the best performing node in the left split of node 421, node 431 may be the best performing node in the right split of node 421, node 432 may be the best performing node in the left split of node 426, and node 433 may be the best performing node in the right split of node 426.

Once the stop criterion are met, at 306 the access rule generation system 300 may generate candidate access rules 334 based on the conditions of the nodes for each split of the tree. Referring to FIG. 4, in one example the stop criterion may be a tree having three levels and the best performing nodes for the four branches may be nodes 430, 431, 432, and 433. Accordingly, the access rule generation system 300 may generate a first candidate access rule having conditions $X_{22}X_{12}X_{45}$, a second candidate access rule having conditions $X'_{22}X'_{12}X_{63}$, a third candidate access rule having conditions $X'_{22}X_{310}X_{17}$, and a fourth candidate access rule having conditions $X'_{22}X'_{310}X_{53}$. The access rule generation system 300 may provide the candidate access rules 334 to an access server to be implemented for determining access request outcomes.

As discussed above, access rule generation system 300 may generate candidate access rules using a decision tree (e.g., decision tree 400) by repeatedly determining the performance of children nodes and then selecting a node to build the branch. This process may require a large amount of computing resources to be expended. For instance, the access request information 310 may include hundreds of thousands of access requests in order to have a representative sample of patterns of fraudulent activity. At each node of a branch, all possible splits are evaluated based on the access request information 310. In addition, the nodes of each level down on the decision tree is dependent on nodes in the previous levels of the tree. Therefore, the access rule generation system 300 may need to expend a large amount of computing resources in each determination and comparison of node performance when building a decision tree since it requires the node performance to be determined and compared numerous times. Therefore, the access rule generation system 300 may take a long time and may expend a large amount of computing resources by generating candidate access rules using a decision tree. This complexity may be compounded in decision trees that use triple-splitting or quart-splitting compared to binary splitting like the example in FIG. 4. The generation and selection of candidate access rules may be processed quicker and more efficiently using segmentation instead of a decision tree as further described below.

III. Rule Generation and Selection Based on Segmentation

Instead of generating access rules using a decision tree as discussed above with reference to FIGS. 3 and 4, an access rule generation system may generate access rules using segmentation. By using mutually exclusive segments, the access rule generation system can generate independent access rules that may be evaluated independently. Therefore, the access rule generation system can implement the access rule generation process in parallel, thereby making access rule generation quicker and more efficient compared to access rule generation processes using a decision tree.

As further described below, generating access rules using segmentation may involve selecting certain access request parameters and segmenting those parameters into a plurality of mutually exclusive conditions. Each access rule may have one condition from each of the selected parameters and access rules for each combination of conditions may be generated. As such, the access rules generated based using segmentation may be generated and evaluated independently, thereby enabling the use of simultaneous parallel processing. Furthermore, generating access rules using a decision tree can require the performance evaluation at each branch split. In contrast, generating access rules using segmentation generates can generate each potential access rule first, and then evaluate all of the potential access rules at once. Therefore, an access rule generation system may generate access rules quicker and more efficiently using segmentation compared to using a decision tree since the decision tree process is iterative and it cannot be performed simultaneously.

A. System for Generating Access Rules Using Segmentation

Figure 5:
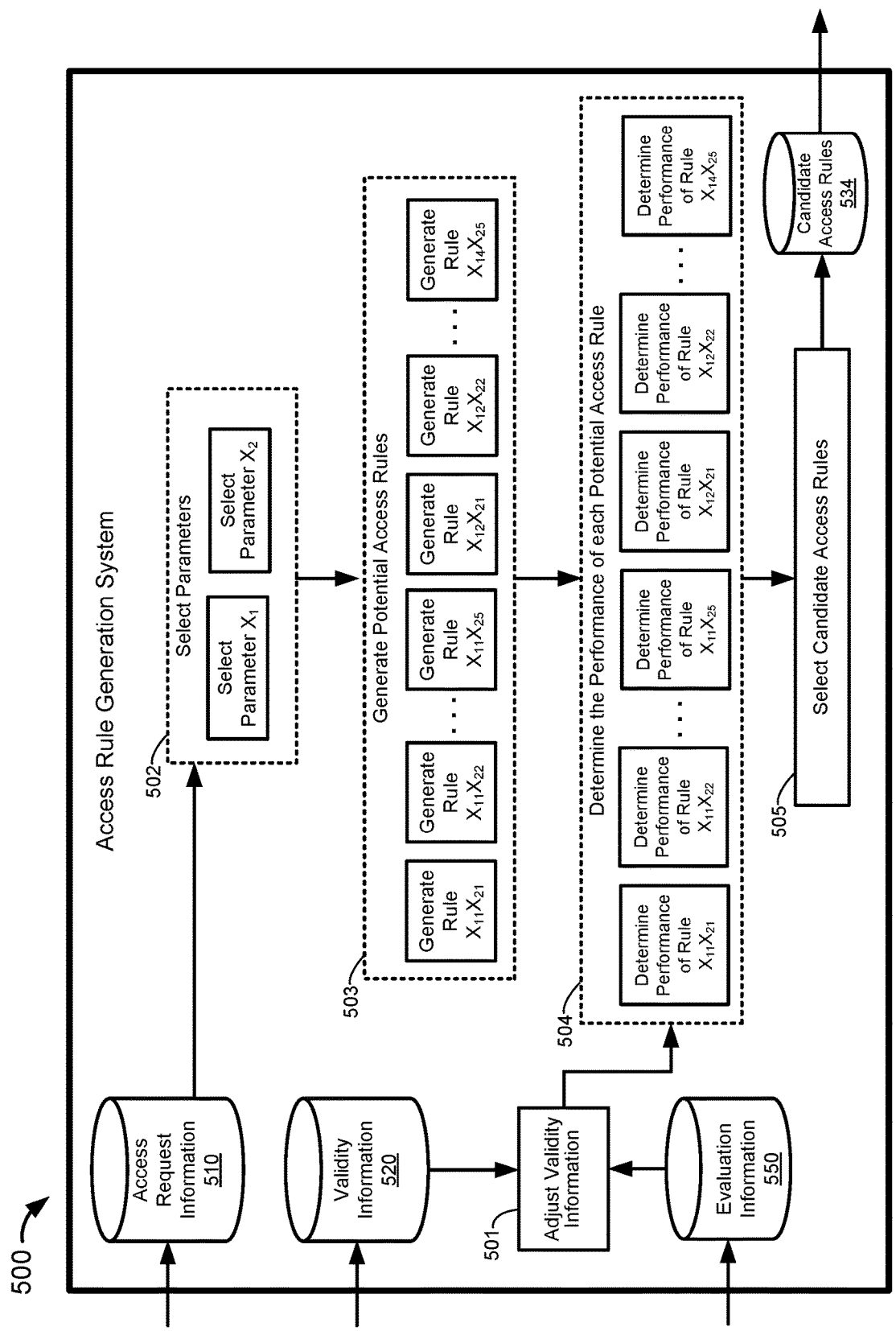
FIG. 5 shows a functional block diagram of an access rule generation system for generating and selecting access rules using segmentation, in accordance with some embodiments.

FIG. 5 shows a functional block diagram of an access rule generation system 500 for generating and selecting access rules using segmentation, in accordance with some embodiments. The access rule generation system 500 may operate similar to the access rule generation system 130 of FIG. 1. The access rule generation system 500 may be implemented in a resource security system similar to the resource security system 100 of FIG. 1 described above.

As further described below, the access rule generation system 500 may generate candidate access rules 534 using segments based on access requests previously received by an access server and validity information corresponding to those access requests. The access rule generation system 500 may then provide the candidate access rules 534 to an access server to be used for determining access request outcomes.

The access rule generation system 500 may store access request information 510, validity information 520, and evaluation information 550 as discussed herein. Before generating the access rules, at 501 the access rule generation system 500 may adjust the validity information 520 using the evaluation information 550 to account for false positives as discussed above.

In order to generate access rules using segmentation, at 502 the access rule generation system 500 may select two or more parameters (e.g., tens or hundreds of parameters) from the access request parameters to use for segmenting the access requests of the access request information 510. For example, at 502 the access rule generation system 500 may select one hundred parameters to use for segmenting the access requests of the access request information 510. The access rule generation system 500 may select parameters that are sensitive to fraudulent access requests. For instance, some of the parameters may be selected based on the conditions of access rules currently implemented by an access server. In some embodiments, instead of the access rule generation system 500 selecting the parameters at 502, the parameters may be pre-selected. That is, the access rule generation system 500 may use pre-determined parameters for generating and selecting access rules. The pre-determined parameters may have been selected based on conditions that are known to be indicative of fraud.

In one example, the access request information 510 may include access requests having a "user geographic location" parameter $X_1$, a "resource amount" parameter $X_2$, a "day of the week" parameter $X_3$, a "time of day" parameter $X_4$, and a "request computer identifier" parameter $X_5$. In this example, the "user geographic location" parameter $X_1$ and the "resource amount" parameter $X_2$ may have associated conditions that are the best indicators of fraud and access rules may be generated having conditions based on these parameters. In other embodiments, the access requests may have different parameters. In other embodiments, the access rule generation system 500 may select a different number of parameters to use for generation access rules.

After selecting the parameters, the access rule generation system 500 may determine a plurality of conditions associated with each of the parameters (e.g., parameter $X_1$ and parameter $X_2$). For instance, the "user geographic location" parameter $X_1$ of an access request may have a categorical parameter value and the access rule generation system 500 may associate conditions $X_{11}$, $X_{12}$, $X_{13}$, and $X_{14}$ with the "user geographic location" parameter $X_1$ based on the different categories. For example, the condition $X_{11}$ may be satisfied by the parameter $X_1$ having a parameter value of "California," the condition $X_{12}$ may be satisfied by the parameter $X_1$ having a parameter value of "Arizona," the condition $X_{13}$, may be satisfied by the parameter $X_1$ having a parameter value of "Oregon," and the condition $X_{14}$, may be satisfied by the parameter $X_1$ having a parameter value of "Washington."

The "resource amount" parameter $X_2$ of an access request may have a numerical parameter value and the access rule generation system 500 may associate conditions $X_{21}$, $X_{22}$, $X_{23}$, $X_{24}$, $X_{25}$ and $X_{26}$ based on numerical ranges of values. For example, the condition $X_{21}$ may be satisfied by the parameter $X_2$ having a parameter value that is less than 100, the condition $X_{22}$ may be satisfied by the parameter $X_2$ having a parameter value that is greater than or equal to 100 but less than 500, the condition $X_{23}$ may be satisfied by the parameter $X_2$ having a parameter value that is greater than or equal to 500 but less than 2,000, the condition $X_{24}$ may be satisfied by the parameter $X_2$ having a parameter value that is greater than or equal to 2,000 but less than 5,000, the condition $X_{25}$ may be satisfied by the parameter $X_2$ having a parameter value that is greater than or equal to 5,000 but less than 20,000, and the condition $X_{26}$ may be satisfied by the parameter $X_2$ having a parameter value that is greater than 20,000. In other embodiments, different threshold values may be used. The access rule generation system may determine the number of conditions and the ranges of the conditions or the number and range of the conditions may be pre-determined for a particular parameter.

After selecting the access request parameters (e.g., parameter $X_1$ and parameter $X_2$), at 503 the access rule generation system 500 may generate a plurality of potential access rules based on the parameters selected at 502. The access rule generation system 500 may generate the plurality of potential access rules such that each access rules has one condition from each of the selected parameters and is independent from each of the other potential access rules. That is, the conditions of the plurality of potential access rules are mutually exclusive. Since the access rules are independent, the access rule generation system 500 may generate the plurality of access rules simultaneously, in parallel.

In some embodiments, after selecting the parameters at 502 but prior to generating the access rules at 503, the access rule generation system 300 may merge two or more conditions of related parameters. Merging multiple conditions into a single condition may reduce the computation complexity of running the access rules since there may be fewer conditions to check. For example, if both conditions $X_{21}$ and $X_{22}$ are selected, the condition $X_{21}$ being satisfied by the parameter $X_2$ having a parameter value that is less than 100, and the condition $X_{22}$ being satisfied by the parameter $X_2$ having a parameter value that is greater than or equal to 100 but less than 500, then conditions $X_{21}$ and $X_{22}$ may be merged. The merged condition may be satisfied by parameter $X_2$ having a parameter value that is less than 500 (e.g., the combination of the conditions $X_2<100$ and $100 \leq X_2<500$).

B. Use of a Segmentation Diagram in Generating Access Rules

Figure 6:
FIG. 6 shows an exemplary segmentation diagram for generating and selecting access rules, in accordance with some embodiments.

A segmentation diagram may be used to represent the mutually exclusive conditions of the potential access rules generated at 503. FIG. 6 shows an exemplary segmentation diagram 600 for generating and selecting access rules, in accordance with some embodiments. The segmentation diagram includes segments 601-620 corresponding to the conditions of the access rules generated at 503. For instance, segment 601 corresponds to the condition $X_{11}X_{21}$, segment 602 corresponds to the condition $X_{11}X_{22}$, etc. As shown in FIG. 6, each of the segments are mutually exclusive.

The access rule generation system 500 may associate each access requests of the access request information 510 with a particular segment 601-620 based on the parameters of the access request. For instance, access requests having parameters that satisfy the conditions associated with a particular segment 610-620 may be associated with that segment 601-620.

In the segmentation diagram 600, the access requests associated with a certain segment 601-620 may be represented by either an "X" mark or an "O" mark within that segment 601-620. The "X" mark represents a fraudulent access request and an "O" mark represents a legitimate access request. The access rule generation system 500 may determine whether a particular access request is legitimate or fraudulent based on the validity information 520 corresponding to that access request. For simplicity, the segmentation diagram 600 only shows a few access requests for each segment 601-620. However, the access rule generation system 500 may generate access rules based on hundreds of thousands of access requests or more. In some embodiments, instead of using the "X" and "O" marks, the access requests may be represented by a validity score where 0.0 indicates a legitimate access request and 1.0 indicates a fraudulent access request. In such embodiments, the validity scores may be adjusted by the access rule generation system (e.g., at 501) to account for false positives as described above.

Referring back to FIG. 5, at 504 the access rule generation system 500 may determine the performance of each potential access rule. In order to determine the performance of each potential access request, the access rule generation server may determine a predictive percentage for each segment 601-620 based on the access requests within that segment 601-620. As shown in the segmentation diagram 600 of FIG. 6, the segment 601 representing the condition $X_{11}X_{21}$ includes one "X" mark and two "O" marks. Therefore, the access rule generation system 500 may determine that that the predictive percentage for segment 601 is 33.33% (e.g., 1 of 3). In addition, the access rule generation system 500 may determine that predictive percentage for segment 602 is 0% (e.g., 0 of 4) and that that predictive percentage for segment 614 is 80% (e.g., 4 of 5) based on the segmentation diagram 600. Since the segments 601-620 are mutually exclusive, each access request may only satisfy the conditions of a single segment. Therefore, the access rule generation system may determine the performance (e.g., determine the predictive percentage) of each segment 601-620 simultaneously and in parallel.

After determining the performance of each segment 601-620, at 505 the access rule generation system 500 may select a plurality of candidate access rules 534 from the potential access rules. For example, the access rule generation system 500 may select the highest performing potential access rules to be included in the set of candidate access rules 534. For example, the access rule generation system 500 may select a certain number of potential access rules or it may select potential access rules having a predictive percentage greater than a particular threshold value. The access rule generation system 500 may provide the candidate access rules 534 to an access server to be implemented for determining access request outcomes.

C. Computer Performance Advantages from Using Segmentation

As discussed above, a decision tree may be used to generate and evaluate potential access rules by building a branch of the tree incrementally, such that later steps are dependent on prior steps as discussed above. In contrast to the decision tree process, potential access rules generated to correspond to mutually exclusive segments of conditions allow for each of the potential access rules be to generated and evaluated independently of the others. Accordingly, the access rule generation system 500 may use a parallel computing process to generate and evaluate the potential access rules quickly and efficiently. For example, the access rule generation system 500 may implement a parallel computing framework (e.g., Apache Hadoop) for generating and selecting candidate access rules using segmentation as discussed above with reference to FIGS. 5 and 6. As such, the access rule generation system 500 may use a segmentation process to generate a set of candidate access rules quicker and using fewer computational resources compared to the access rule generation system 300 which generates access rules using decision tree.

Furthermore, the process of generating and selecting candidate access rules using segmentation is advantageous because it may only determine the performance of each segment once while the process using a decision tree repeatedly determines the performance of each node every time that a node is added to the branch. In addition, the complexity of the segmentation process is based on the number of selected parameters and the conditions within those parameters while a decision tree may operate on all of the parameters and condition. Since the access request information 310, 510 may contain hundreds of thousands of access requests, determining and comparing the performance multiple times in the generation of a single access rule using a decision tree may use a significant amount of computing resources compared to a segmentation process. Furthermore, a segmentation process can operate based on a segmentation table indicating the performance of each segment while a decision tree process may operate on the entire set of access request information. Therefore, the evaluating the performance of access rules generated using segmentation may be more computationally efficient compared to the generation of access rules using a decision tree for the same access request information. Computational complexity for the segmentation process may be further reduced by merging conditions of a related parameter as discussed above.

IV. Exemplary Method for Access Rule Generation

Figure 7:
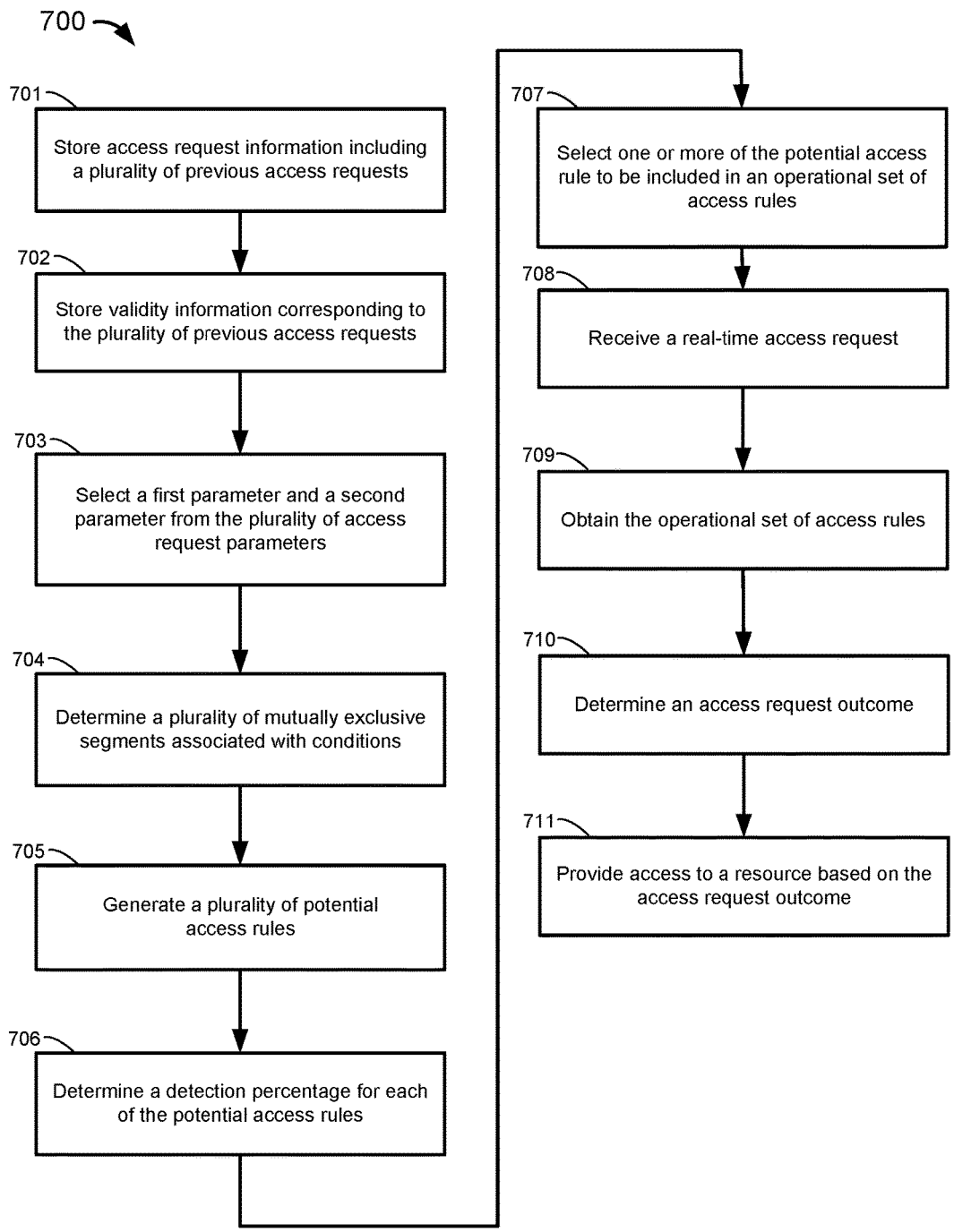
FIG. 7 shows a flowchart of a method for generating and selecting access rules using a computer system, in accordance with some embodiments.

FIG. 7 shows a flowchart 700 of a method for generating and selecting access rules using a computer system, in accordance with some embodiments. The method may be performed by a computer system, such as the resource security system described herein. For example, the method may be performed by the resource security system 100 of FIG. 1 including the access rule generation system 130 and the access server 120. In one exemplary embodiment, the access rule generation system may perform steps 701-707 and the access server may perform steps 708-711. In other embodiments, the method may be performed by a single computer or server. In some embodiments, one or more of the method steps may not be performed and the steps may be performed in a different order.

At 701, the computer system may store access request information including a plurality of previous access requests, each previous access request having a plurality of access request parameters. The plurality of previous access request may have been previously received by an access server. The access request information may also indicate whether the access request outcome for a particular access request was reject, accept, or review.

At 702, the computer system may store validity information corresponding to the plurality of previous access requests, the validity information indicating whether each access request is fraudulent or legitimate. The validity information corresponding to a particular access request may be based on the access request outcome for that access request. The validity information may also be based on a report of fraudulent access or a report of a denial of legitimate access.

In some embodiments, the computer system may determine false positive percentages for access rules currently implemented by an access server. The computer system may then adjust the validity information for an access request based on the false positive percentages for access rules that would be triggered by that particular access request.

At 703, the computer system may select a first parameter and a second parameter from the plurality of access request parameters, the first parameter associated with a first set of conditions, the second parameter associated with a second set of conditions For example, the computer system may select a first parameter $X_1$ and a second parameter $X_2$ as discussed above with reference to FIG. 5. In this example, the first parameter $X_1$ may indicate a "user geographic location" and the second parameter $X_2$ may indicate a "resource amount." In some embodiments, more than two parameters may be selected from the plurality of access request parameters. For example, the computer system may select tens or hundreds of parameters, or even all of from the plurality of access request parameters.

At 704, the computer system may determine a plurality of mutually exclusive segments based on the first set of conditions and the second set of conditions, each segment associated one condition of the first set of conditions and one condition of the second set of conditions. For example, as shown in FIG. 6, the first parameter $X_1$ made include a set of 4 conditions including $X_{11}$, $X_{12}$, $X_{13}$, and $X_{14}$ and the second parameter $X_2$ may include a set of 5 conditions including $X_{21}$, $X_{22}$, $X_{23}$, $X_{24}$, and $X_{25}$. Accordingly, the computer system may determine 20 mutually exclusive segments (e.g., segments 601-620 in FIG. 6) based on the first set of 4 conditions and the second set of 5 conditions, where each segment has one condition from the first set and one condition from the second set.

At 705, the computer system may generate a plurality of potential access rules, each potential access rule corresponding to a different segment of the plurality of mutually exclusive segments, each of the potential access rules having the conditions of the corresponding segment. Each of the potential access rules may be independent. That is, the conditions of one potential access rule may be mutually exclusive to the conditions of the other potential access rules. Since the access rules are independent, the computer system may generate the plurality of access rules simultaneously and in parallel.

At 706, the computer system may determine a predictive percentage for each of the potential access rules based on the validity information corresponding to previous access requests having one or more parameters that involve the conditions of the potential access rule. To determine the predictive percentage for a potential access rule, the computer system may determine a set access requests have parameters that satisfy the conditions of the potential access rule and then determine the percentage of access requests in that set that are fraudulent. The access requests corresponding to a particular may be represented as an "X" mark or an "O" mark as shown in FIG. 4. Since the segments are mutually exclusive, each access request may only satisfy the conditions of one of the segments. Therefore, the access rule generation system may determine the predictive percentage for each of the potential access rules simultaneously and in parallel.

At 707, the computer system may select one or more of the potential access rule to be included in an operational set of access rules based on the predictive percentages for each potential access rule. For example, computer system may select the highest performing potential access rules to be included in a set of candidate access rules which may be provided used in an operational set of access rules. The operations set of access rules may then be used to determine an access request outcome for a newly received access request.

At 708, the computer system may receive a real-time access request. For example, the computer system may receive, over a network, a real-time access request from a user device or an access device, via a resource computer, as discussed above. The access request may include parameters of the access requests.

At 709, the computer system may obtain the operational set of access rules from the system memory. The system memory may comprise RAM, ROM, EEPROM, or flash memory, for example. The system memory may contain code, for implementing the methods described herein. The system memory may be load data from a computer-readable storage medium, such as a hard disk drive or a solid state drive. The system memory may also load data from network-accessible storage media, such as from a database server.

At 710, the computer system may use the operational set of access rules to determine an access request outcome for one of the real-time access requests. The access request outcome may be based on a plurality of access rule outcomes provided by the operational set of access rules as described above. The access request outcome may indicate to accept, reject, or review the access request.

At 711, the computer system may provide access to the resource based on the access request outcome. For example, the computer system may provide access to the resource if the access request outcome indicates to accept the access request. In another example, the computer system may not provide access to the resource if the access request outcome indicated to reject the access request.

V. Exemplary Computer Systems for Access Rule Generation and Implementation

The embodiments described above may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Figure 8:
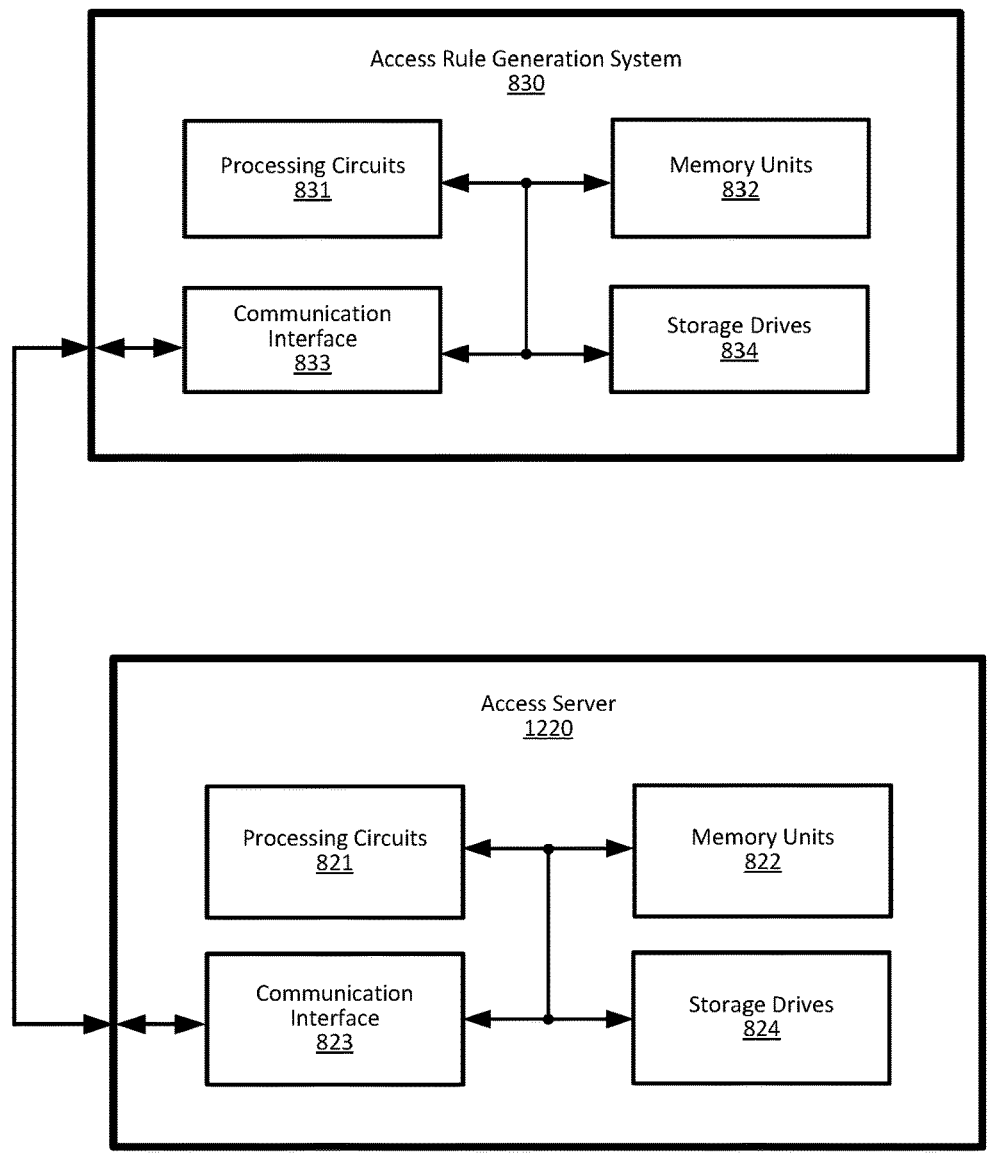
FIG. 8 shows a functional block diagram of components of an exemplary computer system including an access rule generation system and an access server, in accordance with some embodiments.

FIG. 8 shows a functional block diagram 800 of components of an exemplary computer system including an access rule generation system 830 and an access server 820, in accordance with some embodiments. The various components may be embodied by computer hardware or computer code stored on a non-transitory computer readable storage medium.

The access rule generation system 830 may comprise one or more processor circuits 831. The processor circuits 831 may execute instructions to perform the functions of the access rule generation systems described herein (e.g., generating and selecting access rules). The processor circuits 831 may be configured for parallel processing of data. The processor circuits 831 may be coupled to one or more memory units 832 that are configured to store data and instructions. The memory units 832 may be non-transitory computer-readable storage medium. The processor circuits 831 may read data from the memory units 832 and write data to the memory units 832. For example, the processor circuits 831 may load into the memory units 832 a plurality of access request information, validity information, evaluation information, information related access rule performance, and information related to access rule generation, and information related to access rule selection as described herein.

The access rule generation system 830 may also comprise a communication interface 833. The communication interface 833 may receive communications from a communication interface of another computer, such as communications from a resource computer or an access server. The communication interface 833 may also transmit communications to another computer. As described herein, the access rule generation system 830 may receive access request information, validity information, evaluation information, from a resource computer or an access server.

The access rule generation system 830 may also comprise one or more storage drives 834. The storage drives 834 may be directly coupled to the access rule generation system 830 or they may be network access storage drives 834. The storage drives 834 may comprise one or more databases for storing the access request information, the validity information, and the evaluation information described herein. The storage drives 834 may store data that may be loaded into the memory units 832 by the processor circuits 831.

The access server 820 may comprise one or more processor circuits 821. The processor circuits 821 may execute instructions to perform the functions of the access servers described herein (e.g., operating access rules to accept, reject, or review access requests). The processor circuits 821 may be coupled to one or more memory units 822 that are configured to store data and instructions. The memory units 822 may be non-transitory computer-readable storage medium. The processor circuits 821 may read data from the memory units 822 and write data to the memory units 822. For example, the processor circuits 821 may load into the memory units 822 a plurality of access request rules and parameters of an access request in order to determine an access request outcome, as described herein.

The access server 820 may also comprise a communication interface 823. The communication interface 823 may receive communications from a communication interface of another computer, such as communications from a resource computer or an access server. The communication interface 823 of the access server 820 may communicate with the communication interface 823 of the access rule generation system 830. The communication interface 823 may also transmit communications to another computer. The access server 820 may receive access request information and access request parameters via the communication interface 823.

The access server 820 may also comprise one or more storage drives 824. The storage drives 824 may be directly coupled to the access server 820 or they may be network accessible storage drives 824. The storage drives 824 may comprise one or more databases for storing the access request information and the access request parameters. The storage drives 824 may store data that may be loaded into the memory units 832 by the processor circuits 821.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method for generating access rules, the method comprising performing by a computer system:
   storing access request information including a plurality of previous access requests, each previous access request having a plurality of access request parameters;
   storing validity information corresponding to the plurality of previous access requests, the validity information indicating whether each access request is fraudulent or legitimate;
   selecting a first parameter and a second parameter from the plurality of access request parameters, the first parameter associated with a first set of conditions, the second parameter associated with a second set of conditions;
   determining a plurality of mutually exclusive segments based on the first set of conditions and the second set of conditions, each segment associated one condition of the first set of conditions and one condition of the second set of conditions;
   generating a plurality of potential access rules, each potential access rule corresponding to a different segment of the plurality of mutually exclusive segments, each of the potential access rules having the conditions of the corresponding segment;
   determining a predictive percentage for each of the potential access rules based on the validity information corresponding to previous access requests having one or more parameters that involve the conditions of the potential access rule;
   selecting one or more of the potential access rules to be included in an operational set of access rules based on the predictive percentages for each of the potential access rules;
   receiving, over a network from a plurality of devices, a plurality of real-time access requests;
   accessing a system memory to obtain the operational set of access rules when one of the plurality of real-time access requests is received from a first device of the plurality of devices;
   using the operational set of access rules to determine access request outcomes for the real-time access requests; and providing access to a resource based on the access request outcomes.

2. The method of claim 1, wherein the plurality of potential access rules are generated simultaneously in parallel, and wherein the predictive percentages for the plurality of potential access rules are determined simultaneously in parallel.

3. The method of claim 1, wherein each of the plurality of previous access requests has parameters that involve the conditions of a single potential access rule of the plurality of potential access rules.

4. The method of claim 1, further comprising:
determining the first set of conditions based on parameter values of the first parameter, each of the conditions of the first set of conditions being mutually exclusive to the other conditions of the first set of conditions; and
determining the second set of conditions based on parameter values of the second parameter, each of the conditions of the second set of conditions being mutually exclusive to the other conditions of the second set of conditions.

5. The method of claim 1, further comprising:
determining, for each of the potential access rules, a set of previous access requests of the plurality of previous access requests having access request parameters that involve the conditions of the potential access rule; and
determining, for each of the sets of previous access requests, the validity information corresponding to each of the previous access requests in the set of previous access requests, wherein the determining of the predictive percentage for each of the potential access rules is based on the validity information corresponding to each of the previous access requests in the set of previous access requests.

6. The method of claim 1, further comprising:
receiving, over a network from the first device, a first access request having access request parameters;
accessing the system memory to obtain the operational set of access rules in response to receiving the first access request;
determining a first access request outcome for the first access request based on a first access rule and the access request parameters of the first access request, the access request outcome for the first access request indicating to reject the first access request;
determining to accept the access request for evaluation of the first access rule; and
providing access to the resource based on determining to accept the access request.

7. The method of claim 6, further comprising storing evaluation information in response to the determination to accept the access request, the evaluation information including an identifier of the first access request and an identifier of the first access rule.

8. The method of claim 7, further comprising:
receiving a report of fraudulent access to the resource, the fraudulent access resulting from the first access request; and
adjusting validity information corresponding to the first access request based on the report of fraudulent access.

9. The method of claim 8, further comprising:
determining a false positive percentage for the first access rule based on the evaluation information and the report of fraudulent access; and
adjusting the validity information corresponding to previous access requests that were rejected based on the first access rule using the false positive percentage for the first access rule.

10. The method of claim 9, wherein the validity information is used in the determining of the predictive percentage for each of the potential access rules.

11. A computer system, comprising:
a non-transitory computer readable storage medium storing a plurality of instructions; and
one or more processors for executing the instructions stored on the computer readable storage medium to:
store access request information including a plurality of previous access requests, each previous access request having a plurality of access request parameters;
store validity information corresponding to the plurality of previous access requests, the validity information indicating whether each access request is fraudulent or legitimate;
select a first parameter and a second parameter from the plurality of access request parameters, the first parameter associated with a first set of conditions, the second parameter associated with a second set of conditions;
determine a plurality of mutually exclusive segments based on the first set of conditions and the second set of conditions, each segment associated one condition of the first set of conditions and one condition of the second set of conditions;
generate a plurality of potential access rules, each potential access rule corresponding to a different segment of the plurality of mutually exclusive segments, each of the potential access rules having the conditions of the corresponding segment;
determine a predictive percentage for each of the potential access rules based on the validity information corresponding to previous access requests having one or more parameters that involve the conditions of the potential access rule;
select one or more of the potential access rules to be included in an operational set of access rules based on the predictive percentages for each of the potential access rules;
receive, over a network from a plurality of devices, a plurality of real-time access requests;
access a system memory to obtain the operational set of access rules when one of the plurality of real-time access requests is received from a first device of the plurality of devices;
use the operational set of access rules to determine access request outcomes for the real-time access requests; and
provide access to a resource based on the access request outcomes.

12. The computer system of claim 11, wherein the plurality of potential access rules are generated simultaneously in parallel, and wherein the predictive percentages for the plurality of potential access rules are determined simultaneously in parallel.

13. The computer system of claim 11, wherein each of the plurality of previous access requests has parameters that involve the conditions of a single potential access rule of the plurality of potential access rules.

14. The computer system of claim 11, further comprising instructions to:
determine the first set of conditions based on parameter values of the first parameter, each of the conditions of the first set of conditions being mutually exclusive to the other conditions of the first set of conditions; and determine the second set of conditions based on parameter values of the second parameter, each of the conditions of the second set of conditions being mutually exclusive to the other conditions of the second set of conditions.

15. The computer system of claim 11, further comprising instructions to:
    determine, for each of the potential access rules, a set of previous access requests of the plurality of previous access requests having access request parameters that involve the conditions of the potential access rule; and
    determine, for each of the sets of previous access requests, the validity information corresponding to each of the previous access requests in the set of previous access requests, wherein the determining of the predictive percentage for each of the potential access rules is based on the validity information corresponding to each of the previous access requests in the set of previous access requests.

16. The computer system of claim 11, further comprising instructions to:
    receive, over a network from the first device, a first access request having access request parameters;
    access the system memory to obtain the operational set of access rules in response to receiving the first access request;
    determine a first access request outcome for the first access request based on a first access rule and the access request parameters of the first access request, the access request outcome for the first access request indicating to reject the first access request;
    determine to accept the access request for evaluation of the first access rule; and
    providing access to the resource based on determining to accept the access request.

17. The computer system of claim 16, further comprising instructions to store evaluation information in response to the determination to accept the access request, the evaluation information including an identifier of the first access request and an identifier of the first access rule.

18. The computer system of claim 17, further comprising instructions to:
    receive a report of fraudulent access to the resource, the fraudulent access resulting from the first access request; and
    adjust validity information corresponding to the first access request based on the report of fraudulent access.

19. The computer system of claim 18, further comprising instructions to:
    determine a false positive percentage for the first access rule based on the evaluation information and the report of fraudulent access; and
    adjust the validity information corresponding to previous access requests that were rejected based on the first access rule using the false positive percentage for the first access rule.

20. The computer system of claim 19, wherein the validity information is used in the determining of the predictive percentage for each of the potential access rules.

* * * * *